United States Patent [19]

Shemwell

[11] Patent Number: 4,926,050

[45] Date of Patent: May 15, 1990

[54] SCANNING LASER BASED SYSTEM AND METHOD FOR MEASUREMENT OF DISTANCE TO A TARGET

[75] Inventor: David M. Shemwell, Seattle, Wash.

[73] Assignee: Spectra-Physics, Inc., San Jose, Calif.

[21] Appl. No.: 163,854

[22] Filed: Mar. 2, 1988

[51] Int. Cl.$^5$ .............................................. G01C 3/08
[52] U.S. Cl. .......................................... 250/560; 356/4
[58] Field of Search .................. 250/560, 225; 356/1, 356/3, 4, 28

[56] References Cited

U.S. PATENT DOCUMENTS

| | | | |
|---|---|---|---|
| 4,268,167 | 5/1981 | Alderman | 356/1 |
| 4,297,030 | 10/1981 | Chaborski | 356/4 |
| 4,346,988 | 8/1982 | Kimura et al. | 356/4 |
| 4,542,282 | 6/1985 | King | 356/4 |
| 4,593,967 | 6/1986 | Haugen | 356/1 |

Primary Examiner—David C. Nelms
Assistant Examiner—Stephone B. Allen
Attorney, Agent, or Firm—Seed and Berry

[57] ABSTRACT

A distance-measurement system and method for its use. The system includes a transmitter located at one location and a receiver, at least portions of which are located at the second location. The transmitter produces a scanning beam of laser light that is narrow in its scanned direction and broad in the orthogonal direction. The beam is scanned at a substantially constant angular velocity. The receiver has at least a pair of apertures and associated photodiodes held in a predetermined configuration. The receiver measures the time interval between the times at which the apertures are illuminated by the scanning beam. Based on these time intervals, the receiver can calculate the distance from the first location to the second location. The scanned beam can also be polarized and the receiver can include polarization detection and a lateral effect cell to account for relative rotation and tilt of the transmitter and receiver.

18 Claims, 2 Drawing Sheets

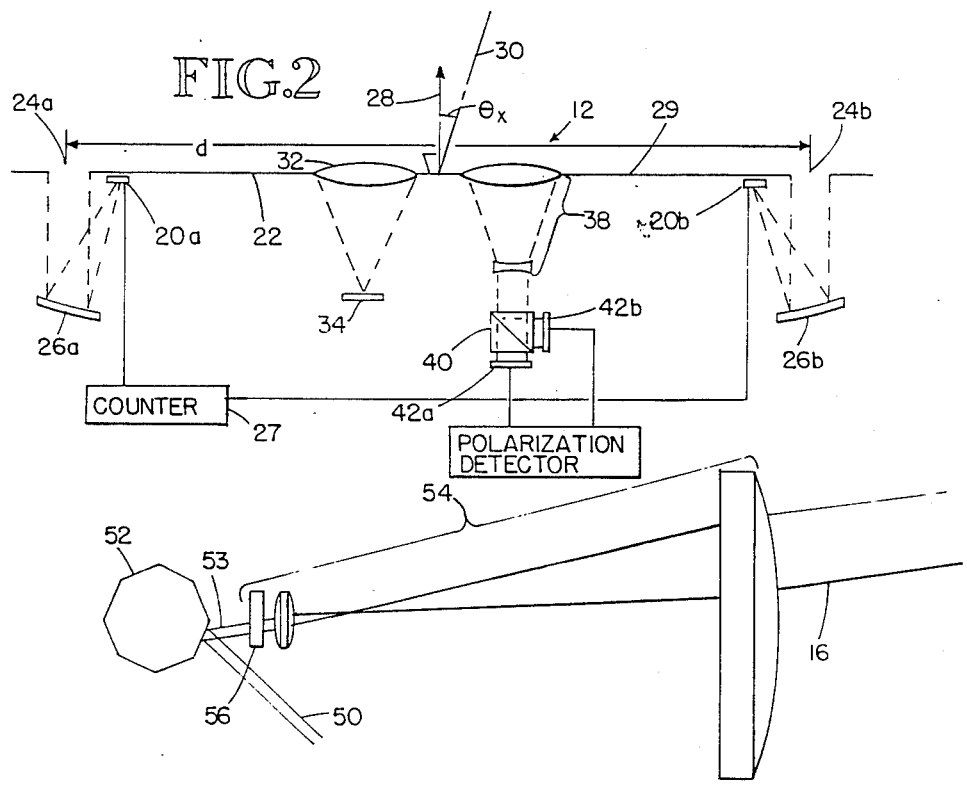
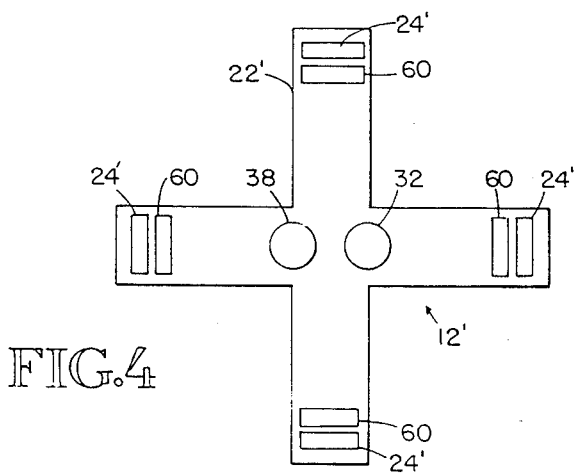

SCANNING LASER BASED SYSTEM AND METHOD FOR MEASUREMENT OF DISTANCE TO A TARGET

DESCRIPTION

1. Technical Field

The present invention relates to a distance-measurement system and method for its use, and more particularly, to a system and method that measure the distance between two locations using a scanning laser beam.

2. Background Art

There are many instances where a vehicle is in need of accurate information regarding its range and orientation relative to another vehicle or desired location. In some of these situations, a vehicle operator is capable of providing this information visually. In other situations, however, the operator's vision is either useless or obscured. In addition, many automated processes, which may not have an operator, require such range and position information.

Conventional radar, lidar, or electronic distance measuring equipment can provide range and range rate information. However, such equipment suffers from problems associated with weight, complexity, and close-range inaccuracy, and is also susceptible to confusion from glints or spurious reflections. It would, therefore, be useful to have a simple and lightweight system that provides range, range rate, and relative orientation, and that is both accurate at close range and free from spurious reflection problems.

DISCLOSURE OF THE INVENTION

It is an object of the present invention to provide a simple, lightweight distance measurement system.

It is another object of the present invention to provide a distance measurement system that is accurate at close range relative to its overall range.

It is yet another object of the present invention to provide a distance measurement system that measures the relative orientation of a receiver at one location to a transmitter at another location.

It is a further object of the present invention to provide a method for measuring the distance between two locations.

According to a broad aspect, the invention is a system for measuring the distance D between a first location and a second location. The system comprises a transmitter and a receiver. The transmitter is located at the first location and produces and directs a scanning beam of electromagnetic energy toward the second location. The receiver comprises a plurality of signal-producing means placed in a predetermined spaced-apart configuration at the second location, each signal-producing means producing a signal when scanned by the scanning beam. The receiver further comprises means for measuring the time interval between the signals produced by the signal-producing means in response to the scanning beam and means for calculating the distance D based on the time interval between the signals produced by the signal-producing means.

In another aspect, the invention is a method for measuring the distance D between a first location and a second location. The method comprises the steps of (a) providing a scanning beam of electromagnetic energy, (b) directing the scanning beam from the first location toward the second location, (c) providing a plurality of signal-producing means that are responsive to the scanning beam in a predetermined spaced-apart configuration at the second location, and (d) causing each signal-producing means to produce a signal when scanned by the scanning beam. The method further comprises the steps of (e) measuring the time interval between the signals produced by the signal-producing means and (f) calculating the distance D based on the time interval between the signals produced by the signal-producing means.

BRIEF DESCRIPTION OF THE DRAWINGS

FIG. 2 is a schematic diagram in plan of the receiver of the distance-measurement system of FIG. 1.

FIG. 3 is a schematic diagram of the transmitter of the distance-measurement system of FIG. 1.

FIG. 4 is a plan view of a second embodiment of a receiver of the distance-measurement system of FIG. 1.

DETAILED DESCRIPTION OF THE INVENTION

Figure 1:
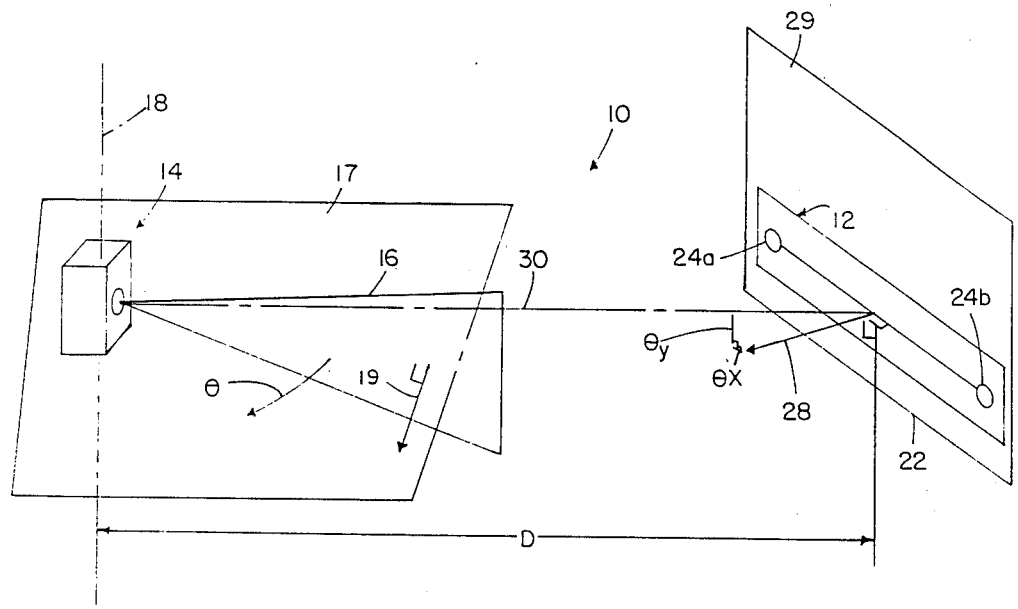
FIG. 1 is a schematic diagram of the distance-measurement system of the present invention.

Referring to FIG. 1, the distance-measurement system 10 is composed of a receiver 12 and a laser scanning transmitter 14. The transmitter 14 can be placed at a first location and at least some components of the receiver 12 can be placed at a second location spaced away from the first location. The transmitter 14 produces a laser beam 16, which can be produced by an infrared diode laser (not shown) and can be scanned at a constant angular velocity $\dot{\theta}$ about an axis 18. Preferably, the laser beam 16 scans within a predetermined angular sector defined with respect to a frame of reference of the transmitter 14, although, if desired, the laser beam 16 can be caused to scan in a complete circular arc. The frame of reference includes the plane 17 which is perpendicular to the axis 18, and contains the angular rotation vector 19. Polarizations of the laser beam 16 that are contained in the plane 17 are termed horizontal polarizations, while polarizations that are orthogonal to the plane 17 are termed vertical polarization.

Referring to FIGS. 1 and 2, the receiver 12 includes a pair of photodiodes 20a and 20b affixed to a planar frame 22 at a rearward side thereof away from the transmitter 14. A pair of apertures 24a and 24b, separated by a fixed distance, are provided in the frame 22. The apertures 24a and 24b are respectively associated with the photodiodes 20a and 20b. The receiver 12 further includes a pair of spherical mirrors 26a and 26b respectively positioned behind the frame 22, at the apertures 24a and 24b, to reflect light from the laser beam 16 passing through the apertures onto the corresponding photodiode. In other embodiments, the light from the laser beam 16 could pass through other collecting optics or directly onto the photodiodes 20. In all embodiments, the distance between the apertures 24a and 24b, or other collecting optics, is d.

The receiver 12 measures the time it takes for the beam 16 to transit the distance d across the frame 22 between the two apertures 24a and 24b by measuring the time between the signals produced by the two photodiodes 20a and 20b in response to the passage of the scanning laser beam 16. The first photodiode 20a to be struck by the light from the laser beam 16 triggers a counter 27. The counter 27 is stopped when the light from the laser beam 16 strikes and activates the second photodiode 20b. The total count accumulated by the counter 27, when multiplied by the counter's clock period, is the measured transit time, t.

From the transit time measurement and the angular scanning frequency of the laser, it is possible to determine the distance D:

$$D = d/t\dot{\theta}$$

where $\dot{\theta}$=angular scan velocity (measured in radians), t=transit time, d=separation of the apertures. The small angle approximation has been used.

If the frame 22 is positioned so that a normal vector 28, defined with respect to the plane 29 containing the two apertures 24a and 24b, does not coincide with a straight line 30 extending between the first and second locations, the projected distance between the apertures 24 in the direction of the transmitter 14 is less than d. Accordingly, a correction factor, based on the amount and direction of the angular deviation between the normal vector 28 and line 30, can be calculated. In applications where this angular deviation is significant, the deviation must be measured and used to correct the projected distance.

If the receiver frame 22 is significantly tilted relative to the scanning laser beam 16, so that the normal vector 28 is out of alignment with the line 30 or if the receiver frame 22 is rotated about the normal vector 28 relative to transmitter 14, two coordinates of the deviation between the normal vector 28 and the line 30 must be determined. The angular deviation can be measured in terms of an angular component in the plane defined by the normal vector 28 and the line between apertures 24a and 24b ($\theta_x$) and the angular component perpendicular to the plane of $\theta_x$ ($\theta_y$) Two assemblies in the center of the receiver frame 22 provide this information. One assembly is composed of a lens 32 and a lateral effect cell (LEC) 34. Such a lateral effect cell (LEC) is made by United Detector Technologies. The outputs of the LEC 34 are the x,y coordinates of a spot of light produced when the lens 32 focuses the scanning laser beam 16 onto the LEC 34, thereby indicating the tilt of the receiver frame 22 relative to the line 30. When the LEC 34 is aligned with the direction of the laser beam 16 along the line 30, the beam's image will appear at the center of the LEC 34. Any tilt of the receiver 12 in relation to the direction to the transmitter 14 will produce an off-center placement of the image on the LEC 34. This information provides the tilt correction to the distance measurement and also gives the receiver 12 the $\theta_x$, $\theta_y$ angular components between the normal vector 28 and the line 30.

The second assembly in the center of the receiver frame 22 measures the angle of rotation between the receiver 12 and the transmitter 14 relative to the line 30. To accomplish this, the laser beam 16 can be linearly polarized in one particular direction (e.g., vertical) with respect to the frame of reference of the transmitter 14. The second assembly is composed of a small telescope 38, a polarizing beam splitter 40, and the photodiodes 42a and 42b and analyzes the state of polarization incident on the receiver 12.

The state of polarization is determined by separating the polarization of the laser light scanning the receiver 12 into two orthogonal components. The first of the components can be in the plane defined by the line between the two apertures 24a and 24b and the normal vector 28. The second component can be perpendicular to the first component. The beam splitter 40 transmits one of the two polarization components directly from the telescope 38 to the photodiode 42a and reflects the other component to the photodiode 42b. From the relative intensities of the two polarization components, the polarization angle of the light contained in the laser beam 16 is easily determined. This information provides a second correction to the transmit time measurement and also provides the receiver 12 with information about its rotation relative to the transmitter 14.

In summary, the receiver 12 provides range, direction, and orientation information concerning the receiver 12 and the transmitter 14. Closing velocity can also be calculated by the receiver 12 by using distance measurements which are separated by a known time interval. This is exactly the information a distance-measurement system should provide to carry out a rendezvous/docking, approach, or station-keeping operation.

The transmitter 14 is shown in FIG. 3. It includes three major parts a laser (not shown) that produces a laser beam 50, a polygonal scanning mirror 52, and a telescope 54. The laser beam 50 strikes the polygonal scanning mirror 52, which rotates and produces a light beam 53 that is scanned at a substantially constant angular velocity. This light beam 53 enters the telescope 54, which expands the laser beam 50 to produce the laser beam 16. The laser beam 16 is relatively thin, e.g., a fraction of an inch thick in its scanning dimension This narrow dimension allows the laser beam 16 to propagate a long distance (e g., 1 kilometer) before the effects of diffraction become significant. In addition to expanding the beam 53, the telescope 54 also includes a small cylindrical lens 56 that spreads the beam out in the direction perpendicular to the scan direction. This increases the total solid angle illuminated by the laser beam 16, making it easier for the receiver 12 to be captured by the transmitter 14 Those skilled in the art will appreciate that the scanning mirror 52 could be replaced by a resonant scanner.

The transmitter 14 can be used in one of two modes: fixed or tracking In the fixed mode, the distance-measurement system 10 need have no moving parts other than the scanning mirror 52. In this case, a vehicle carrying the receiver 12 would have to move into a fixed corridor defined by the total scan angle and the divergence of the cylindrical lens 56 in order to be subject to distance measurements. The size of this corridor depends to some extent on the desired range of the system and the scanning repetition rate. The tracking mode would use a controlled gimbaled mirror (not shown) at the exit of the beam-expanding telescope 54. This gimbaled mirror could be controlled, using tracking methods known to those skilled in the art, to track any vehicle carrying a receiver 12, in order to increase the range of solid angle over which the distance-measurement system 10 could function.

Specific applications for the distance-measurement system of the present invention include spacecraft and shipboard operations. Unmanned space vehicles must have a high level of autonomy This is especially true for vehicles operating at great distances, which make direct remote control impractical The distance-measurement system 10 described above can be applied to the automated docking of spacecraft where weight and simplicity are particularly important.

For a space vehicle, a modified receiver 12' as shown in FIG. 4 could be used to accommodate the wider range of potential orientations of two spacecraft about the roll axis. As shown in FIG. 4, the receiver 12' can consist of two separate pairs of photodiodes 20, with corresponding spherical mirrors 26 or other optical collectors (not shown), and apertures 24' in an array along mutually perpendicular arms of a receiver frame 22' having a cross configuration. The polarization measurement assembly, which receives light from the scanning beam 16 through the telescope 38, can cause the receiver 12' to activate the pair of photodiodes whose apertures are most widely spaced in the scanning direction of the laser beam 16 In other embodiments, the receiver 12 can combine the relative times of passage of the laser beam 16 across each of the apertures 24, regardless of the amount of roll of the receiver relative to the transmitter 14.

Handling of ships also requires a precise knowledge of trajectories and closing rates This can be easily recognized when one considers the tremendous momentum associated with even a slowly moving ship. There are several ship handling situations where the distance-measurement system 10 would be useful.

One situation occurs in docking a ship, where the ship or tug pilot is not able to see clearly the point of contact between the ship and a dock. If a transmitter 14 from the present distance-measurement system 10 were located on the dock and each docking ship had a receiver 12, the ship-to-dock distance and closing rate would be immediately available with great precision.

Another shipboard application is to locate vessels working within a harbor. For example, a dredging barge could locate itself precisely at a desired position without the need for tedious and near-constant taking of bearings by screw members.

In a final example, the distance-measurement system 10 would be useful as an aid during mid-sea replenishing operations. In these operations, two ships maintain a fixed separation while under way. A receiver 12 and transmitter 14 would be located on each ship, and each ship would accordingly be continuously apprised of its relative separation and velocity relative to the other ship. Due to the precision of the distance-measurement system, the crews of the ships would be made aware of any changes in the separation between the ships long before an unaided human could notice. In view of the momentum involved, this information would be invaluable in preventing collisions, particularly at night or in bad weather.

The distance measurements can also be made at the location of the transmitter 14 (or some remote location) In this case, as is shown in FIG. 4, the vehicle whose distance to the transmitter 14 is being measured is equipped with reflectors 60 that are placed in a predetermined configuration. The laser light reflected by the reflectors is received at the remote location with a time interval separation that measures the distance between the transmitter 14 and the reflector-equipped vehicle.

The distance-measurement system 10 of this invention can be used to provide a variety of vehicles with accurate range and orientation information. The applications cited above are only a few of those that are envisioned. The system 10 could also find uses in fully automated aircraft, ground robots, or even in surveying and construction applications. The system 10 is not easily confused by spurious reflections, which can be troublesome with conventional lidar and radar techniques In addition, the distance-measurement system 10 becomes intrinsically more accurate as the range closes.

While various embodiments of the distance-measurement system 10 of the present invention have been described in detail, those skilled in the art will readily appreciate that various modifications of the above-described embodiments may be made without departing from the spirit and the scope of the invention. In particular, while the specific embodiments have been described in terms of a scanning laser beam, scanning beams of other electromagnetic energy could be used equally well. Accordingly, the present invention is to be limited only by the following claims.

I claim:

1. A system for measuring the distance D between a first location and a second location, comprising:
    a transmitter located at the first location for producing an directing a scanning beam of electromagnetic energy toward the second location; and
    a receiver, comprising
        a plurality of signal-producing means placed in a predetermined spaced-apart configuration at the second location, each signal-producing means producing a signal when scanned by the scanning beam,
        means for measuring the time interval between the signals produced by the signal-producing means in response to the scanning beam,
        means for measuring the rotation of the transmitter relative to the configuration of the signal-producing means, and
        means for calculating the distance D based on the time interval between signals produced by the signal-producing means and correcting the calculated distance for the measured rotation of the transmitter relative to the configuration of the signal-producing means.

2. A system for measuring the distance D between a first location and a second location, comprising:
    a transmitter located at the first location for producing and directing a scanning beam of electromagnetic energy toward the second location; and
    a receiver located at the second location, comprising
        a plurality of sensors in a predetermined spaced-apart configuration, each sensor producing a signal when it senses the scanning beam,
        means for measuring the time interval between the signals produced by the sensors in response to the scanning beam,
        means for measuring the rotation of the transmitter relative to the configuration of the signal-producing means, and
        means for calculating the distance D based on the time interval between the signals produced by the sensors and correcting the calculated distance D for the measured rotation of the transmitter relative to the configuration of the signal-producing means.

3. A system for measuring the distance D between a first location and a second location, comprising:
    a transmitter located at the first location for producing and directing a scanning beam of electromagnetic energy toward the second location, the scanning beam having a predetermined polarization relative to a frame of reference of the transmitter; and
    a receiver, comprising
        a plurality of signal-producing means placed in a predetermined spaced-apart configuration at the second location, each signal-producing means producing a signal when scanned by the scanning beam, means for measuring the polarization of the received scanning beam relative to the configuration of the signal-producing means, means for measuring the rotation of the configuration of the signal-producing means relative to the frame of reference of the transmitter from the relative polarization, means for measuring the time interval between the signals produced by the signal-producing means in response to the scanning beam, and means for calculating the distance D based on the time interval between the signals produced by the signal-producing means.

4. A system for measuring the distance D between a first location and a second location, comprising:

a transmitter located at the first location for producing and directing a scanning beam of electromagnetic energy toward the second location, the scanning beam having a predetermined polarization relative to a frame of reference of the transmitter; and a receiver located at the second location, comprising a plurality of sensors placed in a predetermined spaced-apart configuration, each sensor producing a signal when it senses the scanning beam, means for measuring the polarization of the received scanning beam relative to the configuration of sensors, means for measuring the rotation of the configuration of sensors relative to the frame of reference of the transmitter from the relative polarization, means for measuring the time interval between the signals produced by the sensors in response to the scanning beam, and means for calculating the distance D based on the time interval between the signals produced by the sensors.

5. A system for measuring the distance D between a first location and a second location, comprising:

a transmitter located at the first location for producing and directing a scanning beam of electromagnetic energy toward the second location; and a receiver, comprising a plurality of signal-producing means placed in a predetermined spaced-apart configuration at the second location, each signal-producing means producing a signal when scanned by the scanning beam, means for measuring the time interval between the signals produced by the signal-producing means in response to the scanning beam, the means for measuring the time interval being located at the second location and means for calculating the distance D based on the time interval between the signals produced by the signal-producing means, the means for calculating the distance D being located at the second location.

6. The system of claim 5 wherein the scanning beam has a predetermined polarization relative to a frame of reference of the transmitter and the receiver further comprises means for measuring the polarization of the received scanning beam relative to the configuration of the signal-producing means and determining the rotation of the configuration of the signal-producing means relative to the transmitter frame of reference from the relative polarization.

7. The system of claim 6 wherein the scanning beam is scanned about an axis at a substantially constant angular rate $\dot{\theta}$, the axis being fixed relative to the frame of reference of the transmitter.

8. A system for measuring the distance D between a first location and a second location, comprising:

a transmitter located at the first location for producing and directing a scanning beam of electromagnetic energy toward the second location; and a receiver located at the second location, comprising a plurality of reflective means in a predetermined configuration for producing a plurality of reflected pulses of electromagnetic energy by reflecting the scanning beam of electromagnetic energy toward the first location, said means being located at the second location, means for measuring the time interval between receipt of said plurality of said reflected pulses of electromagnetic energy, said means being located at the first location, and means for calculating the distance D based on the measured time intervals, said means being located at the first location.

9. The system of claim 8 wherein the scanning beam has a predetermined polarization relative to the frame of reference of the transmitter and the receiver further comprises means for measuring the relative polarization of the received scanning beam and determining the rotation of the receiver relative to the transmitter frame of reference therefrom.

10. A system for measuring the distance D between a first location and a vehicle at a second location, comprising:

a transmitter located at the first location for producing and directing a scanning beam of electromagnetic energy toward the vehicle, the beam being scanned at a substantially constant angular rate $\theta$ about an axis that is fixed relative to a frame of reference of the transmitter; and a receiver supported by the vehicle at the second location, comprising a plurality of signal-producing means placed in a predetermined spaced-apart configuration, each signal producing means producing a signal when scanned by the scanning beam, signal processing means for measuring the time interval between the signals produced by the signal-producing means in response to the scanning beam, means for determining the tilt of an axis of the vehicle with respect to the direction to the first location, and processor means for calculating the distance D from the time interval and the tilt.

11. The system of claim 10 wherein the means for determining the tilt of the axis of the vehicle is a lateral effect cell.

12. The system of claim 10 wherein the scanning beam has a predetermined polarization relative to a frame of reference of the transmitter and the receiver further comprises means for measuring the polarization of the received scanning beam relative to the configuration of the signal-producing means and determining the rotation of the configuration of the signal-producing means relative to the frame of reference of the transmitter from the relative polarization and the processor means further calculates the distance D from the measured polarization.

13. The system of claim 12 wherein the scanning beam is scanned about an axis at a substantially constant angular rate $\dot{\theta}$, the axis being fixed relative to a frame of reference of the transmitter.

14. The system of claim 13 wherein the receiver comprises two sensors separated by a fixed distance d, the two sensors producing signals separated by a time interval t and the means for calculating the distance operates in accordance with the formula $D=fd/t\dot{\theta}$, where f is a function of the tilt and the rotation.

15. A method for measuring the distance D between a first location and a second location, comprising the steps of:
(a) providing a scanning beam of electromagnetic energy;
(b) directing the scanning beam from the first location toward the second location;
(c) providing a plurality of signal-producing means responsive to the scanning beam in a predetermined spaced-apart configuration at the second location;
(d) causing each signal-producing means to produce a signal when scanned by the scanning beam;
(e) measuring the time interval between the signals produced by the signal-producing means;
(f) measuring the rotation of the transmitter relative to the configuration of the signal-producing means; and
(g) calculating the distance D based on the time interval between the signals produced by the signal-producing means and on the rotation of the transmitter relative to the configuration of the signal-producing means.

16. The method of claim 15, further comprising the step of scanning the scanning beam about a fixed axis at a substantially constant angular rate $\dot{\theta}$.

17. A system for measuring the distance D between a first location and a second location, comprising:
a transmitter located at the first location for producing and directing a scanning beam of electromagnetic energy toward the second location about an axis of a substantially constant angular rate $\dot{\theta}$, the axis being fixed relative to a frame of reference of the transmitter; and
a receiver located at the second location, comprising
a plurality of sensors in a predetermined spaced-apart configuration, each sensor producing a signal when its senses the scanning beam,
means for measuring the time interval between the signals produced by the sensors in response to the scanning beam, and
means for calculating the distance D based on the time interval between the signals produced by the sensors.

18. The system of claim 17 wherein the receiver comprises two sensors separated by a fixed distance d, the two sensors producing signals separated by a time interval t and the means for calculating the distance D operates according to the formula $D=d/t\dot{\theta}$.

* * * * *

UNITED STATES PATENT AND TRADEMARK OFFICE
CERTIFICATE OF CORRECTION

PATENT NO. : 4,926,050

DATED : May 15, 1990

INVENTOR(S) : David M. Shemwell

It is certified that error appears in the above-identified patent and that said Letters Patent is hereby corrected as shown below:

In claim 1, column 6, line 16, delete "an" and substitute therefor --and--.

In claim 9, column 8, line 39, delete "$\theta$" and substitute therefor --$\dot{\theta}$--.

Signed and Sealed this

Eighth Day of October, 1991

*Attest:*

HARRY F. MANBECK, JR.

*Attesting Officer*     *Commissioner of Patents and Trademarks*